United States Patent
Eike et al.

(10) Patent No.: US 6,308,812 B1
(45) Date of Patent: Oct. 30, 2001

(54) CLUTCH CONTROL VALVE

(75) Inventors: Craig R. Eike, DeKalb; Guy T. Stoever, Naperville, both of IL (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/390,873

(22) Filed: Sep. 7, 1999

(51) Int. Cl.$^7$ .............................. F16D 25/00; F16D 13/72
(52) U.S. Cl. .................................. 192/85 R; 192/109 F; 192/113.35
(58) Field of Search ........................... 192/113.35, 109 F, 192/70.12, 85 R

(56) References Cited

U.S. PATENT DOCUMENTS

| | | | |
|---|---|---|---|
| 3,351,169 | * | 11/1967 | McIndoe ............................. 192/85 R |
| 4,557,363 | * | 12/1985 | Golan ............................ 192/70.12 X |
| 5,518,098 | * | 5/1996 | Zanetel et al. .................. 192/113.35 |
| 5,613,588 | * | 3/1997 | Vu ................................... 192/113.35 |
| 6,098,771 | * | 8/2000 | Vu ..................................... 192/70.12 |

FOREIGN PATENT DOCUMENTS 2-120517 * 5/1990 (JP) ................................ 192/113.35

* cited by examiner

*Primary Examiner*—Rodney H. Bonck
(74) *Attorney, Agent, or Firm*—Foley & Lardner

(57) ABSTRACT

A work vehicle configured for selectively applying power to a load and comprising a frame, a plurality of ground support devices movably secured to the frame, an engine supported by the frame, a source of hydraulic fluid at a pressure, a clutch for selectively coupling the engine to the load in response to a control signal, the clutch including a clutch actuator configured for engaging the clutch upon receipt of an actuating fluid at least a first predetermined pressure, the clutch configured to dissipate heat of engagement to a flow of a lube fluid; and a clutch control valve located intermediate the fluid source and the clutch and disposed in the path of the actuating fluid and the lube fluid. The control valve is configured to control flow of the lube fluid to the clutch to a first predetermined rate while the clutch is not engaged, to control flow of the lube fluid to the clutch to a second predetermined rate at least for a predetermined length of time prior to engagement of the clutch, and to control flow of the actuating fluid at a predetermined pressure to the clutch actuator after the flow rate of the lube fluid has been increased.

40 Claims, 8 Drawing Sheets

CLUTCH CONTROL VALVE

FIELD OF THE INVENTION

The present invention relates generally to systems for transmission of mechanical power. It relates more particularly to a work vehicle which includes a power transmission control system configured to remove heat of engagement of a clutch.

BACKGROUND OF THE INVENTION

Clutches are widely used to couple driven rotary shafts to driving rotary shafts; i.e., to couple a load to a source of power. Because in most instances a driven shaft is stationary and a driving shaft is moving, slippage occurs between engaging surfaces of a driven member of the clutch and of a driving member of the clutch while friction between these surfaces accelerates the driven shaft to the speed of the driving shaft during engagement of a clutch. The relative motion of slippage in the presence of friction generates heat. If the load is large (e.g., a hydraulic system starting against pressure or a device high in mass moment of inertia), a great deal of heat may be generated.

A disc clutch is a type of clutch often provided in both stationary and mobile equipment (e.g., industrial machinery, marine drives, agricultural power takeoffs, etc.). A disk clutch includes at least one generally disc-shaped driving member (termed herein "pressure plate" and coupled to an input, or driving, shaft) and at least one generally disc-shaped driven member (termed herein "clutch plate" and coupled to an output, or driven, shaft). An actuator located within or upon the clutch forces the pressure plate against the clutch plate when clutch engagement is desired, whereupon frictional drag of pressure plate upon clutch plate accelerates the driven shaft (connected to a load) up to the speed of the driving shaft (connected to a prime mover such as an engine or a motor).

In some such instances (e.g., automotive engine-to-transmission coupling and uncoupling), convective cooling by ambient air is sufficient to carry away the heat of engagement. In other instances (e.g., an agricultural tractor power takeoff, or PTO, shaft) a clutch smaller in diameter than that of an automotive engine flywheel is desired and, to transmit the torque, a plurality of pressure plates and clutch plates is needed. Such clutches generally do not dissipate heat sufficiently rapidly to avoid damage to seals, bearings and other components, particularly when operating under harsh circumstances such a duty cycle including frequent engagements with a high-inertia load in a high ambient temperature.

Many stationary and mobile clutches are therefore configured as multidisk clutches, including a plurality of pressure plates and clutch plates and, typically, a hydraulic piston within a sealed chamber to force the plates into engagement with each other. These are often "wet" clutches; i.e., the pressure plates and clutch plates are housed within a second chamber contiguous with the first chamber, and a liquid lubricant with coolant properties (termed "lube fluid" herein) is introduced to the second chamber in, typically, a small quantity sufficient to lubricate and cool bearings and seals but not enough to create a large hydrodynamic drag upon the pressure and/or clutch plates and thereby a parasitic power loss. To assist in dissipating small amounts of heat generated by bearings and seals while the clutch is not in the process of being engaged, the small quantity of lube fluid is constantly replaced by slowly introducing cooled fluid while simultaneously removing a similar flow rate of warmed fluid.

In some instances, however, including some agricultural applications such as a tractor PTO clutch, the amount of heat generated during engagement is so large that the small quantity and flow rate of lube fluid is inadequate to prevent overheating of the clutch. It is then desirable to increase the quantity and flow rate of lube fluid during engagement of the clutch.

It is known to provide a valved relationship between a pressure plate piston chamber and a chamber housing pressure and clutch plates, often utilizing passages machined within a shaft. Such valving relationships do not, however, provide an anticipatory, or "look-ahead", or feed-forward control condition with the result that a rapid engagement of the clutch may prevent the added lube fluid from reaching the interior of the second chamber in time to prevent excessive heat buildup. Moreover, passages internal to a shaft weaken the shaft, particularly when they are configured as intersecting drilled holes having sharp corners which serve as stress risers, and also when located in the region of a shaft keyseat.

It is also known to provide an electronic control system to ensure that actuating fluid is not applied at pressure to the clutch piston until lube fluid flow rate and/or level have increased sufficiently to dissipate the heat of engagement. Such a control system may be expensive, however, particularly when the costs of related sensors, actuators and/or valves, and signal conditioning and/or converting apparatus are considered. Further, the higher component count of such a system may negatively impact system reliability, particularly when operating in a harsh environment.

It would be advantageous to provide for a power transmission system to be useable for a mobile work vehicle as well as for a stationary power unit, the power transmission system including a control valve which responds to an electronic ENGAGE signal by increasing lube fluid flow rate from a first rate to a second rate over a predetermined interval of time before increasing clutch piston actuating fluid pressure.

It would further be advantageous to provide for the control valve of such a power transmission system to reduce lube fluid flow rate from the second rate to a predetermined third rate over a second predetermined time interval after increasing lube fluid flow rate from the first rate to the second rate, so that the increased lube fluid flow rate and level exist substantially only while the clutch is in the process of engaging.

SUMMARY OF THE INVENTION

The present invention relates to a work vehicle configured for selectively applying power to a load and comprising a frame, a plurality of ground support devices movably secured to the frame, an engine supported by the frame, a source of hydraulic fluid at a pressure, a clutch for selectively coupling the engine to the load in response to a control signal, the clutch including a clutch actuator configured for engaging the clutch upon receipt of an actuating fluid at at least a first predetermined pressure, the clutch configured to dissipate heat of engagement to a flow of a lube fluid; and a clutch control valve located intermediate the fluid source and the clutch and disposed in the path of the actuating fluid and the lube fluid, the control valve configured to control flow of the lube fluid to the clutch to a first predetermined rate while the clutch is not engaged, to control flow of the lube fluid to the clutch to a second predetermined rate at least for a predetermined length of time prior to engagement of the clutch, and to control flow of the actuating fluid at a predetermined pressure to the clutch actuator after the flow rate of the lube fluid has been increased.

The present invention also relates to a power transmission system for selectively transmitting power to a load and comprising a power source, a source of hydraulic fluid at a pressure, a clutch for selectively coupling the power source to the load in response to a control signal, the clutch including a clutch actuator configured for engaging the clutch upon receipt of an actuating fluid at at least a first predetermined pressure, the clutch configured to dissipate heat of engagement to a flow of a lube fluid; and a clutch control valve located intermediate the fluid source and the clutch and disposed in the path of the actuating fluid and the lube fluid, the control valve configured to control flow of the lube fluid to the clutch to a first predetermined rate while the clutch is not engaged, to control flow of the lube fluid to the clutch to a second predetermined rate at least for a predetermined length of time prior to engagement of the clutch, and to control flow of the actuating fluid at a predetermined pressure to the clutch actuator after the flow rate of the lube fluid has been increased.

The present invention further relates to a control apparatus for a hydraulically operated wet disk clutch, the clutch including a piston actuated by actuating fluid at a predetermined actuating fluid pressure and coupled to at least one clutch disk, a chamber surrounding the at least one clutch disk and at least one pressure disk and containing a controllably variable amount of lube fluid for lubrication of the clutch and for removal of heat generated by friction during engagement of the clutch disks, the control apparatus including a control valve adapted to control flow of the lube fluid to the clutch to a first predetermined rate while the clutch is not engaged, to control flow of the lube fluid to the clutch to a second predetermined rate at least for a predetermined length of time prior to engagement of the clutch, and to control flow of the actuating fluid at a predetermined pressure to the clutch actuator after the flow rate of the lube fluid has been increased.

The present invention also relates to a method of removing heat of frictional engagement from a wet disk clutch, the method comprising the steps of shifting a sliding member of a control valve a first distance to open a port of a lube fluid spool of the sliding member and thereby increase a flow of a cooling lube fluid to a first rate, and subsequently shifting the sliding member an additional second distance to open a port of an actuating fluid spool of the sliding member and thereby transmit an actuating fluid at an actuation fluid pressure to an actuator of the clutch.

DESCRIPTION OF THE DRAWINGS

A full understanding of the clutch control valve may be gained from the appended Drawings taken in conjunction with the Detailed Description below, wherein like reference numerals refer to like parts.

DETAILED DESCRIPTION OF EXEMPLARY EMBODIMENTS

Figure 1:
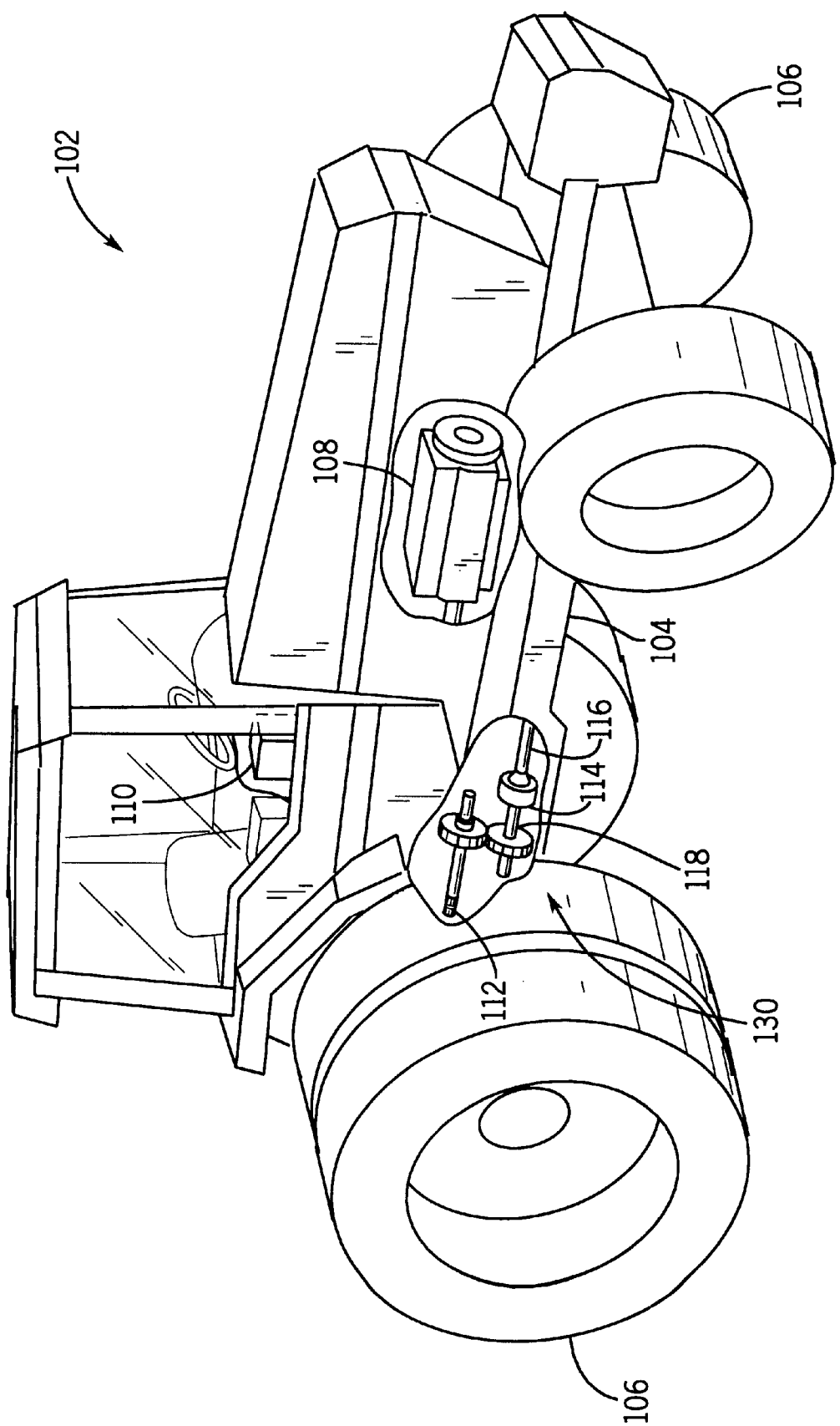
FIG. 1 is a broken-away perspective view of work vehicle provided with a power take-off (PTO) shaft and clutch.

FIG. 1 shows a work vehicle, in the illustrated instance an agricultural tractor 102, but it should be understood that the work vehicle can be used in the agricultural, industrial and construction industries. Tractor 102 includes a vehicle structure, an engine 108, ground support devices shown as wheels 106, a power transmission system 130, and a source 110 of power transmission system control signals. The engine and transmission can be configured to provide 2 or 4-wheel drive to the vehicle. Frame 104 supports the engine 108 (which can be gasoline or diesel) and wheels 106, and engine 108 may be selectively coupled to wheels 106 to move tractor 102 over a surface; e.g., a road or a farm field.

Power transmission system 130 is generally also supported by frame 104, and includes a power take-off (PTO) shaft 112 and a clutch 114. Clutch 114 is adapted for selectively coupling and uncoupling PTO shaft 112 to and from engine 108. Control signal source 110 is configured for controllably and selectively providing an ENGAGE signal to an actuator (described below) of clutch 114. Control signal source 110 may be configured in any of the many ways known to those of skill in the art; e.g., a manual switch or potentiometer located at an operator's station, a limit switch associated with a related process, a relay or high-output semiconductor in an on-board or remote and GPS-based precision farming control system, etc.

Power transmission system 130 is not confirmed to use with agricultural tractors or other mobile work vehicles (e.g., harvesters, end loaders, etc.), and is equally useful for coupling and uncoupling a load to and from a stationary source of rotative power; e.g., a skid-mounted engine or power unit, electrical or hydraulic motor, etc.

Figure 2:
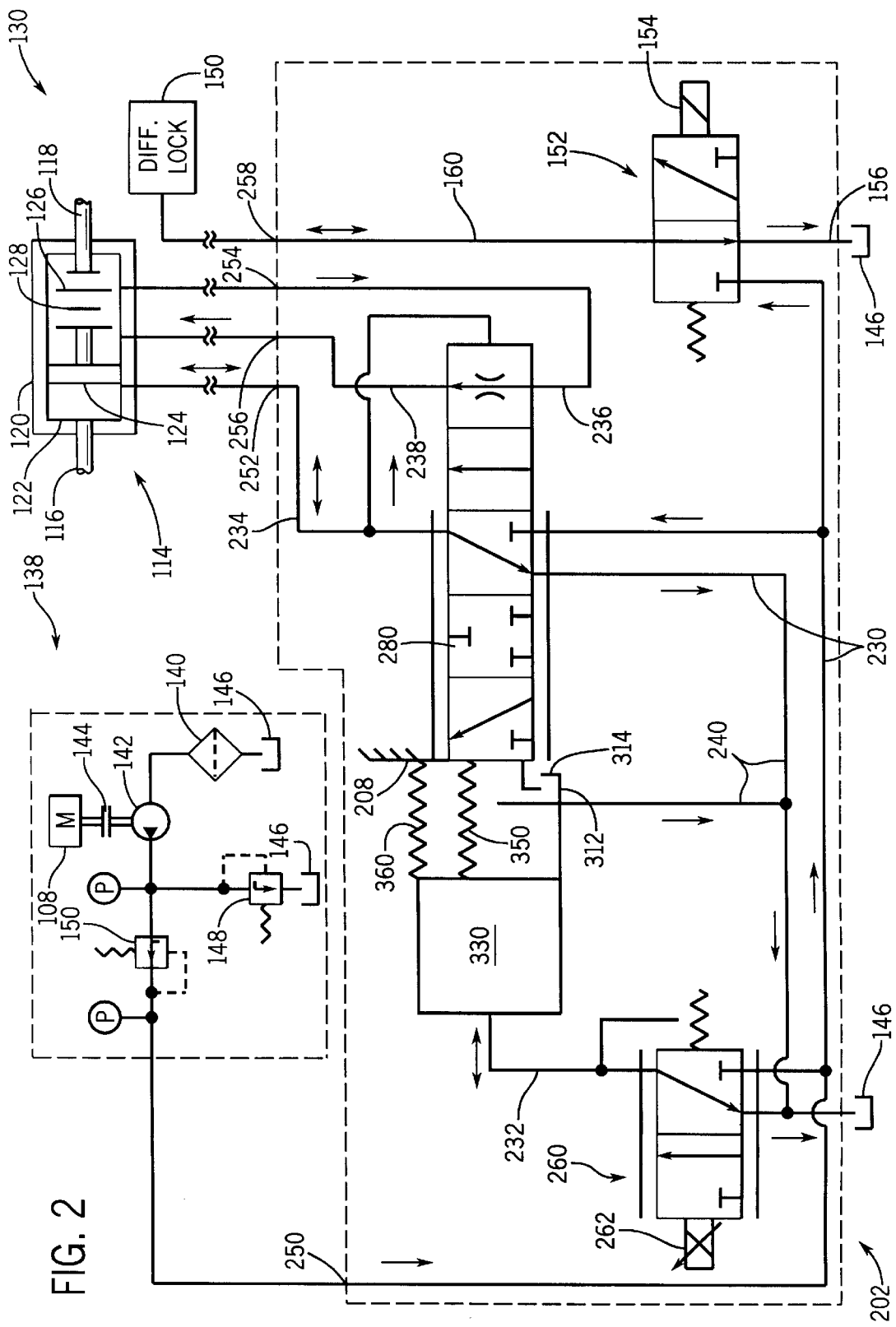
FIG. 2 is a schematic diagram of a preferred embodiment of a clutch lube fluid flow rate control system including a clutch lube fluid flow rate control valve.

FIG. 2 shows power transmission system 130 including clutch 114, configured as a wet disk clutch. Power control system 130 further includes a source (in a preferred embodiment, a hydraulic power unit (HPU) 138) of hydraulic fluid for actuating, lubricating, and cooling clutch 114; and a control apparatus including a means for controlling flow rates and/or pressures of fluids, illustrated as a multi-circuit control valve 202 disposed in the path of fluid between HPU 138 and clutch 114. Valve 202 is coupled to HPU 138 and clutch 114 by suitable conduits (not shown); e.g., hydraulic fluid tube assemblies, hydraulic hose assemblies, and hydraulic fluid fittings. In alternative embodiments (not shown), valve 202 is contained within a clutch housing or a transmission housing.

Clutch 114 includes at least one pressure plate 126 coupled to an input shaft (or comparable device) 116, at least one clutch plate 128 coupled to an output shaft (or comparable device) 118, and a housing 120 surrounding pressure plate 126 and clutch plate 128 and capable of containing a quantity of lubricating and cooling fluid, or "lube fluid", for lubricating and cooling clutch 114. Clutch 114 further includes an actuator, shown as a chamber 122 housing a clutch actuating piston 124 which is coupled to pressure plate 126 in a manner which urges pressure plate 126 into facial contact with clutch plate 128 when fluid under pressure, or "actuating fluid", is admitted to chamber 122, the force of urging corresponding to the pressure of the actuating fluid. Suitable openings are provided for connecting and sealing conduits (not shown) in communication with control valve 202 for actuation fluid to flow in to and out of chamber 122 and for lube fluid to flow in to and out of housing 120.

HPU 138 is shown of a typical construction, including a hydraulic fluid pump 142 coupled to engine 108 by a coupling 144, a fluid reservoir shown as a tank 146; a fluid filter shown as a suction strainer 140, a fluid pressure relief valve 148, and a fluid pressure regulating valve 150. Typically, such items are functionally included within both stationary and mobile equipment (e.g., tractor 102) hydraulic power supplies; additional items, such as one or more tank return line filters, an accumulator, or a heat exchanger may also be included as needed for various processes and environments.

The portion of FIG. 2 showing control valve 202 is most easily and fully understood by viewing it in conjunction with FIGS. 4–7, discussed below.

Figure 3:
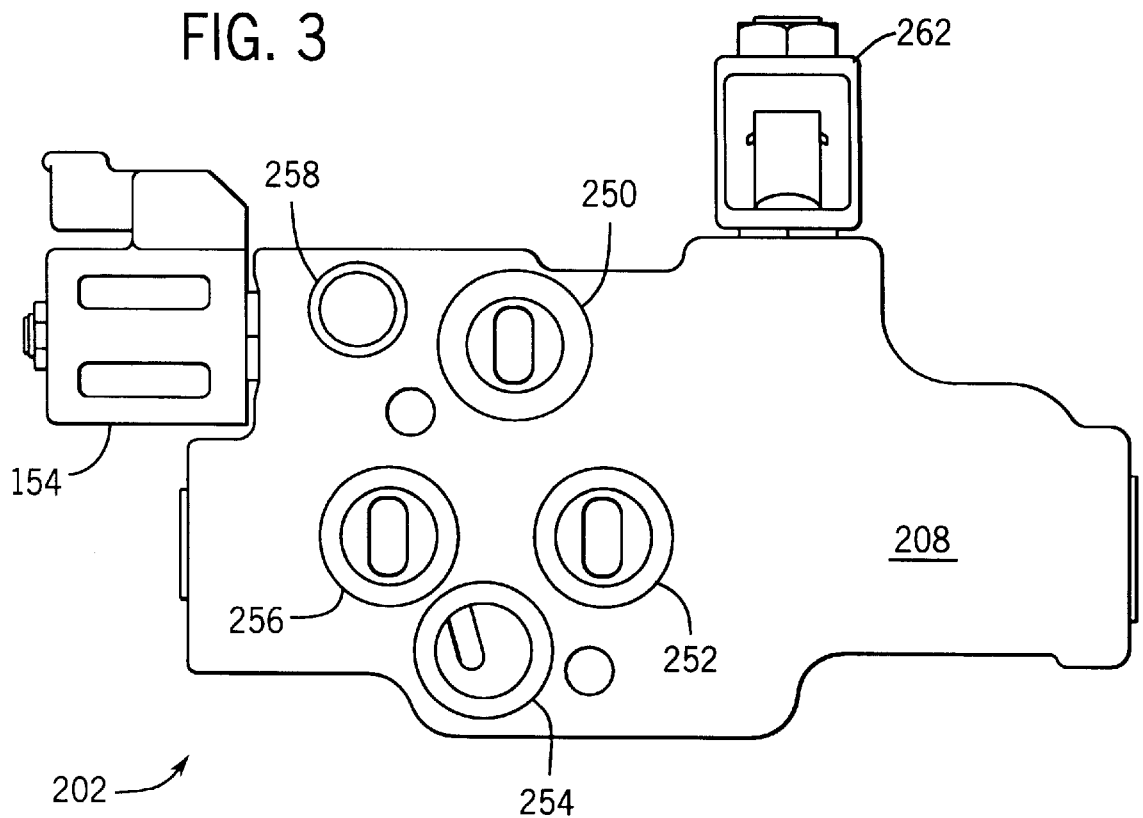
FIG. 3 is a side elevation of a preferred embodiment of the control valve

Referring now to FIG. 3, control valve 202 includes a valve body 208. Valve body 208 includes a first body end 210 an d a second body end 212. Valve body 208 further includes various fluid inlet and outlet ports which are in communication with corresponding passages (discussed below) cored, or otherwise formed, within body 208, as shown in FIGS. 4–7. The ports include a main fluid inlet port 250 which receives fluid under regulated pressure from an outlet port of HPU 138 (shown in FIG. 2) through a suitable conduit (not shown); an actuation fluid port 252 which is in communication with chamber 122 of clutch 114; and a lube fluid inlet port 254 and a lube fluid out let port 256 which are in communication with an interior of housing 120 of clutch 114.

Not visible and located on other surfaces of body 208 are one or more tank return ports, for return of spent fluid (i.e., fluid which has given up pressure while doing work) to tank 146, from whence it is again drawn and pressurized by pump 142.

Control valve 202 may be configured for control or actuation of coincidental functions other than those described above, which functions may be related to equipment other than clutch 114. This is done typically for economy of manufacture, and for compactness and simplicity, of power transmission system 130; i.e., to avert a necessity of manufacturing, assembling and installing, and plumbing a separate valve having its own valve body. For example, control valve 202 is shown in FIGS. 4 through 7 including a separate solenoid-operated spool valve 152 for control of a differential gearset lockup apparatus, or differential lock. FIG. 3, therefore, shows control valve 202 including also a differential lock fluid port 258.

Figure 4:
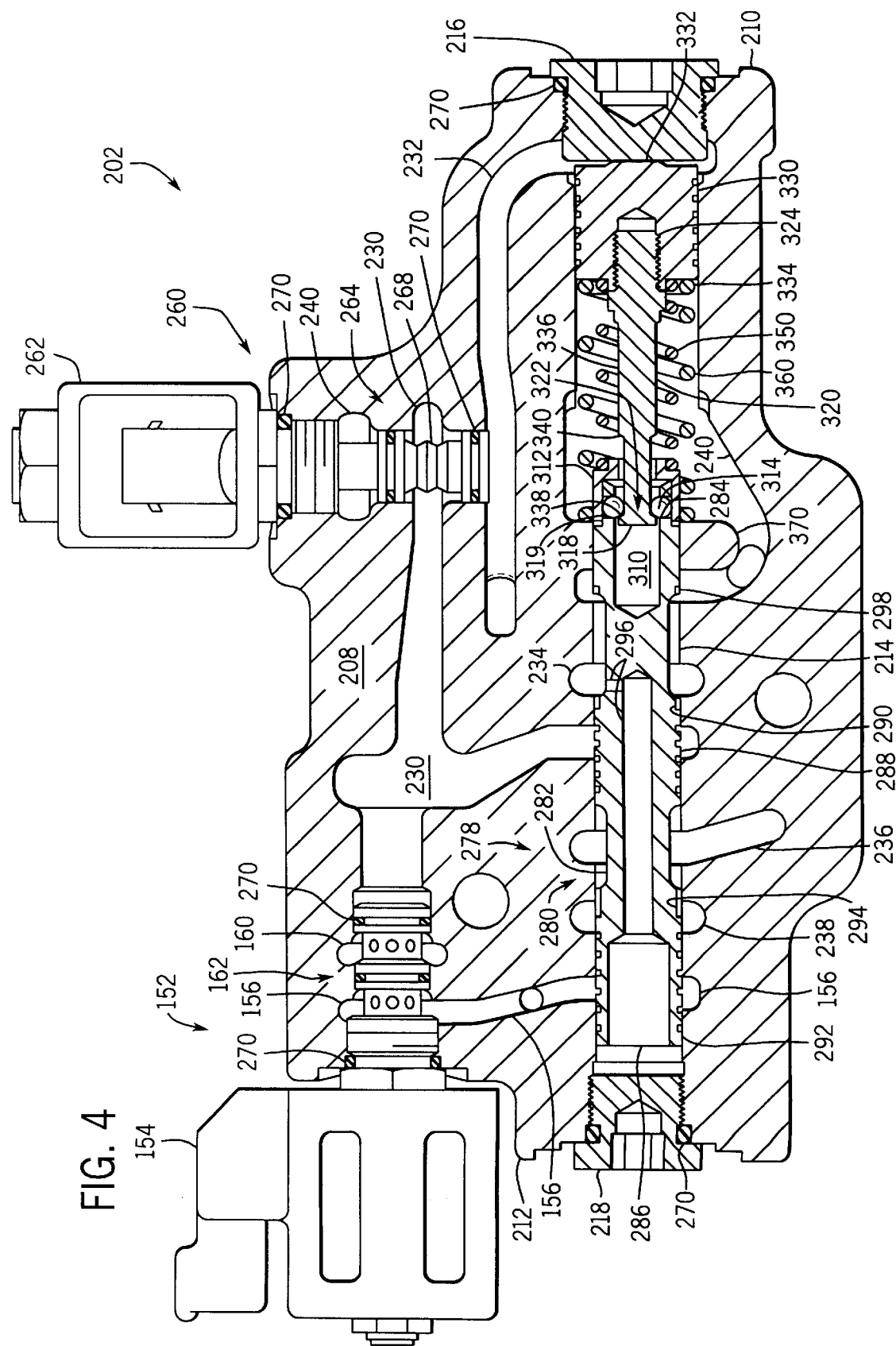
FIG. 4 is a side sectional elevation of a preferred embodiment of the control valve shown in a steady-state low pressure and flow rate condition.
Figure 5:
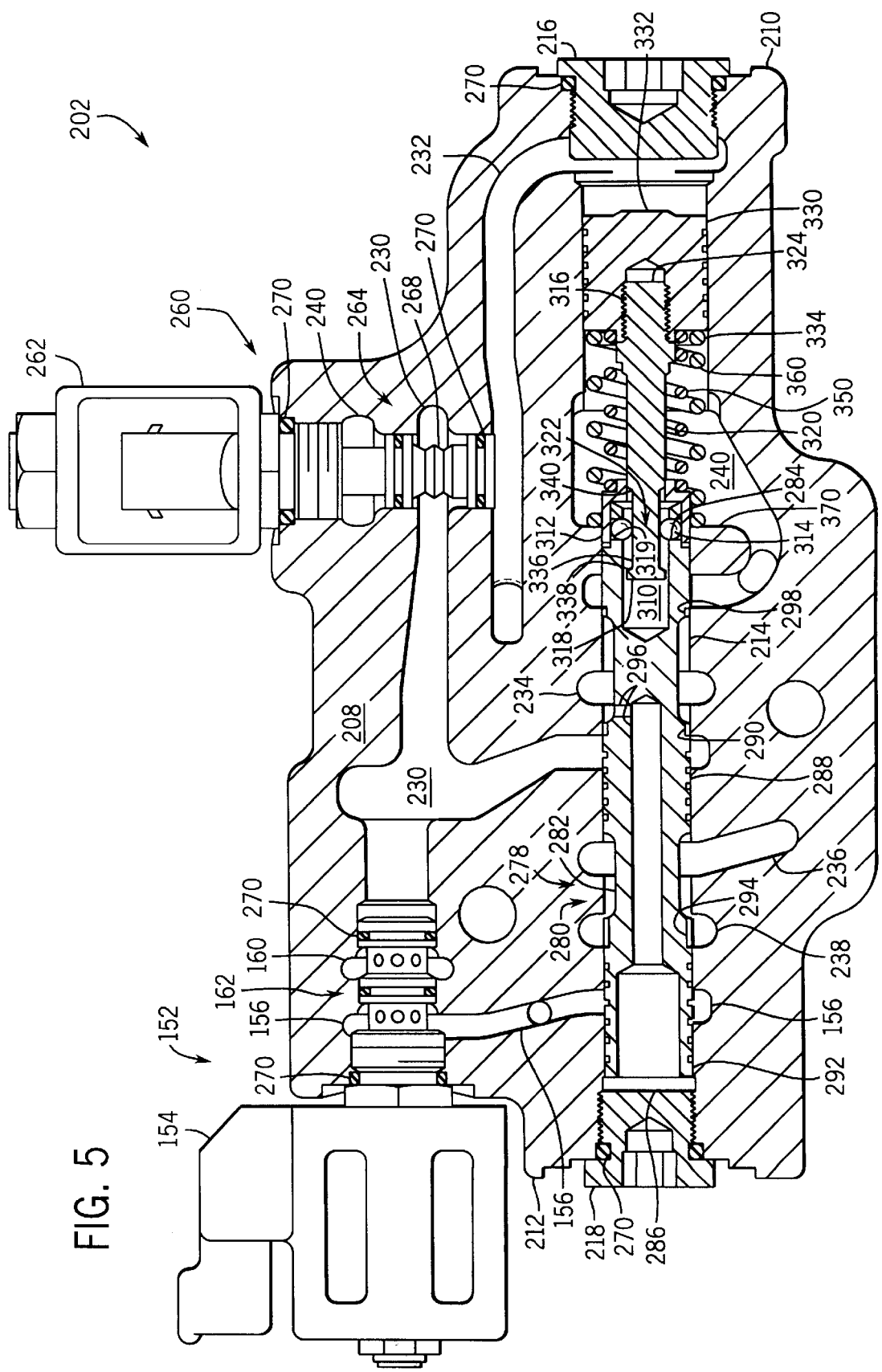
FIG. 5 is a side sectional elevation of the control valve shown in a transient-pressure and flow rate condition.
Figure 6:
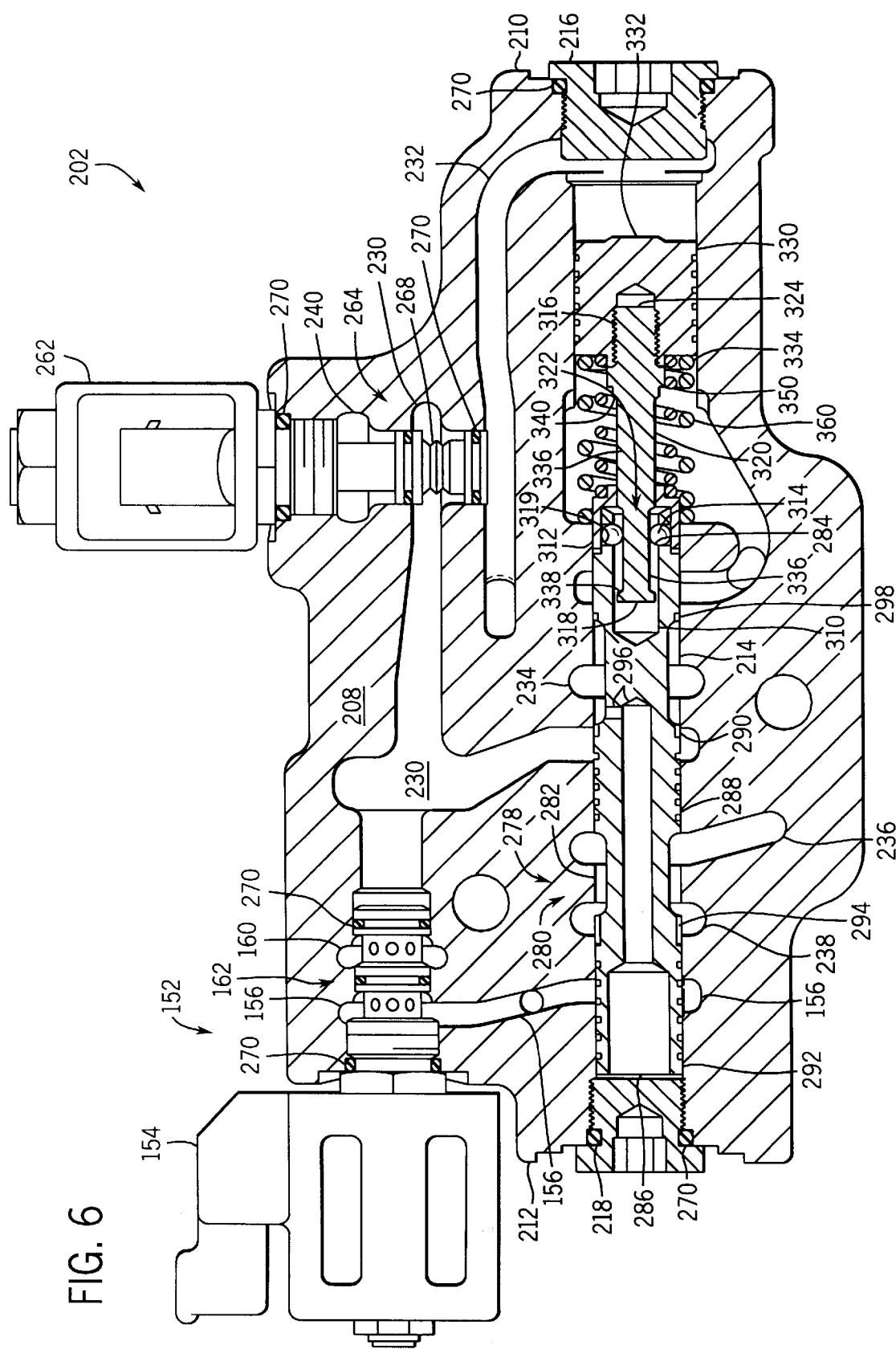
FIG. 6 is a side sectional elevation of the control valve shown in a pressure and flow rate modulating condition.
Figure 7:
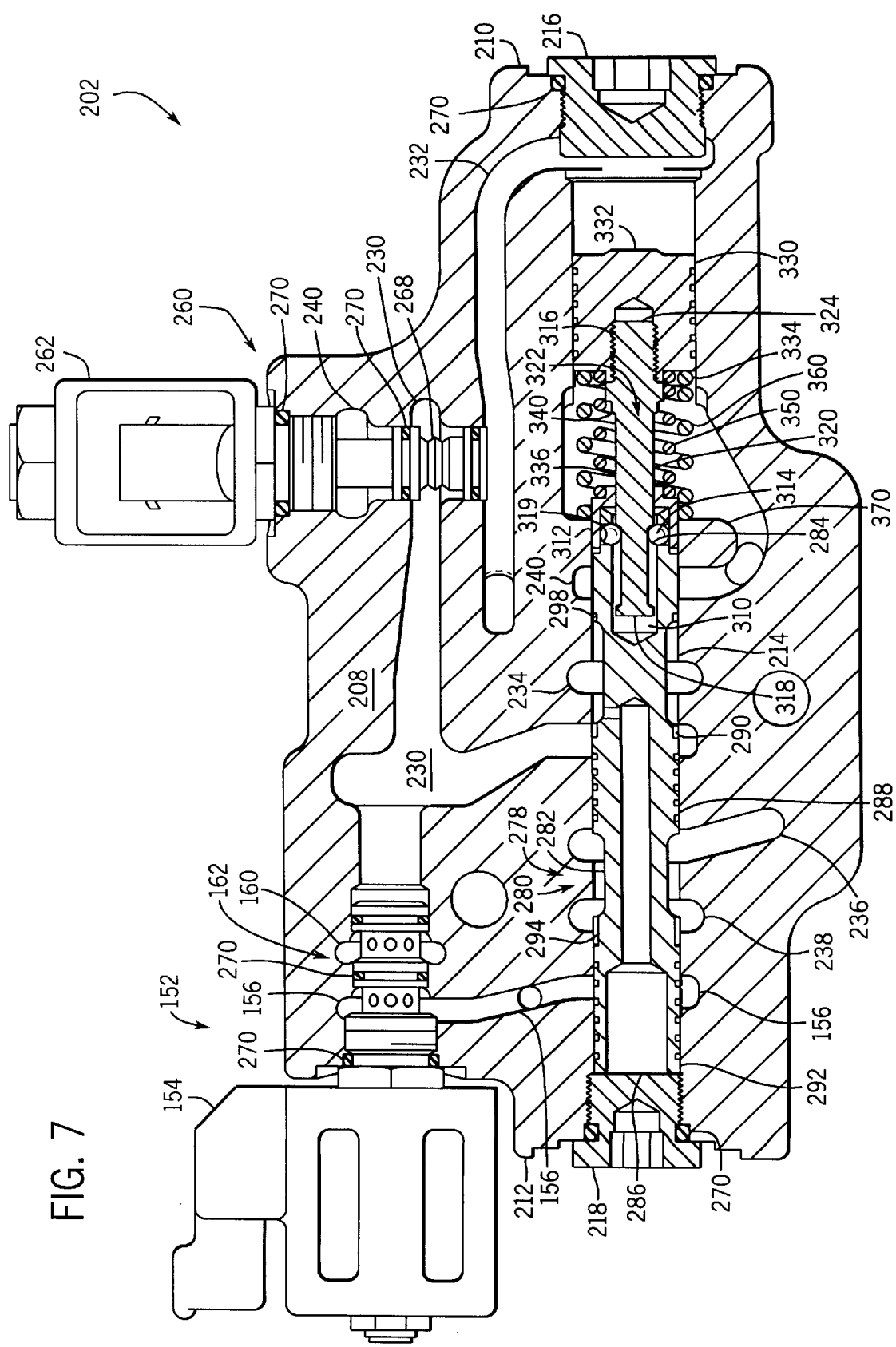
FIG. 7 is a side sectional elevation of the control valve shown in a steady-state high pressure and flow rate condition.

FIGS. 4–7 show control valve 202 in various conditions of clutch 114 control, described more fully below. Briefly and for the purpose of introduction, FIG. 4 shows control valve 202 in an at-rest condition of producing no actuation pressure and little or no lube fluid flow; FIGS. 5 and 6 show intermediate operating conditions, and FIG. 7 shows control valve 202 in a condition of producing high actuation pressure and maximum lube fluid flow.

Referring back to FIG. 2 now in conjunction with FIG. 4, body 208 includes main fluid inlet port 250 which is in communication with a main inlet core 230. Main inlet core 230 is the source of fluid at pressure for several devices including a control fluid signal proportional solenoid valve 260, which includes an ENGAGE signal proportional solenoid 262 for shifting a control fluid signal valve spool assembly 268 within a generally cylindrical cavity 264 in proportion to a controllably variable electrical ENGAGE control signal transmitted from remote signal source 110. The electrical ENGAGE signal may be of any of the types known to those of skill in the art and compatible with control fluid valve solenoid 262; e.g., direct current (DC) voltage or current level, pulse width modulated (PWM), etc.

In a preferred embodiment, the electrical control signal is a DC current signal dithered to keep spool assembly 268 moving thereby enhancing valve sensitivity by keeping frictional drag of spool assembly 268 a function of a dynamic coefficient of friction instead of the corresponding static coefficient of friction, which is generally significantly larger with or without lubrication. Pressure drop of fluid across spool assembly 268 is a function of the mean level of the dithered control signal received by solenoid 262.

The controllably variable drop in pressure from the predetermined regulated pressure of the fluid in main inlet core 230 provides a controllably variable pressure in fluid downstream of control fluid valve 260, within a control fluid signal core 232, which is in correspondence with the electrical control signal received by solenoid 262 from source 110. This fluid is thereby a control fluid, and is seen in FIG. 4 to be in contact with a first end 332 of a piston 330 located near first end 210 of valve body 208, piston 330 thereby producing a longitudinally disposed force in correspondence with the electrical control signal. The force is opposed, in the condition represented by FIG. 4, by a preload spring 360.

Piston 330 is housed within a longitudinally disposed cavity 214, portions of which are accurately formed in generally cylindrical and coaxial configurations to slidingly and sealingly receive piston 330 and members of a sliding member assembly 278, which is coupled to a second 334 of piston 330 by a stem 320 in a relationship described below. After machining, shaping, broaching, grinding, plating, polishing, or other operations performed in fashioning of cavity 214, which may require access for tooling from at least one end of body 208, any resulting openings are closed during assembly of valve 202 by a threaded and sealed first-end plug 216 and a threaded and sealed second-end plug 218.

Sliding member assembly 278 includes a sliding member 280, a plurality of balls 314, and a ball retaining cap 312, described below. A first end 284 of sliding member assembly 278 engages second end 318 of stem 320, a first end 324 of which is coupled to piston second 334 by screw threads 316, and a sliding 280 member second end 286 is located in the region of valve body second end 212. A longitudinally disposed cavity 310 is located within a first end of sliding member 280 adjacent first end 284 of sliding member assembly 278, for receiving in sliding relationship second end 318 of stem 320. Sliding member 280 includes a lube fluid valving spool 292 located in the region of sliding member assembly 278 second end 286 and a clutch actuator valving, or modulating, spool 288 located intermediate sliding member assembly 278 first end 284 and lube fluid spool 292. Lube fluid spool portion 292 is separated from modulating spool portion 288 by a spool land at the first end 284 of the lube land 282. Controlled longitudinal repositioning of sliding member assembly 278 within cavity 214 by piston 330 in response to control signal fluid pressure in control signal core 232 causes predetermined changes in flow rates of lube and the pressures of actuating fluids.

In a preferred embodiment, and when valve 202 is at rest in the absence of an ENGAGE signal as shown in FIG. 4, an end of preload spring 360 bears upon second 334 of piston 330 while an opposite end of preload spring 360 is seated upon a surface of body 208, shown as an internal wall 370, and thereby urges piston 330 to a right-most position within cavity 214. Sliding member assembly 278, coupled to piston 330 by stem 320 in a manner described below, is thereby also drawn to a right-most position. In that position, modulating spool 288 completely blocks flow from main inlet core 230 to an actuating fluid core 234 and no pressurized actuating fluid is transmitted to chamber 122 of clutch 114 (shown in FIG. 2).

Sliding member assembly 278 includes a tank drain notch 298 for draining chamber 122 of clutch 114 and actuator fluid core 234 to a tank return core 240, when it is desired to disengage clutch 114, as well as to prevent minor leakage from accumulating in actuator fluid core 234 and eventually inadvertently pressurizing clutch chamber 122.

In a particularly preferred embodiment, a small portion of a lube fluid spool 292 outlet notch 294 is open to a lube fluid outlet core 238 as well as to a lube fluid inlet core 236, and a small "maintenance" flow rate of lube fluid is thereby allowed to flow to clutch 114 to maintain any incidental lubricating and cooling needs of clutch 114 while clutch 114 is disengaged and not generating significant amounts of heat.

First end 324 of stem 320 is rigidly affixed to piston 330 by threads 316, in a longitudinally coaxial relationship. Cavity 310 of sliding member assembly 278 is made of a diameter greater than is that of stem 320 by an amount sufficient to provide a sliding relationship of stem 320 within cavity 310. A portion of the length of stem 320 adjacent second end 334 is constructed of a reduced diameter to form a stem narrowing 336 of stem 320, stem narrowing 336 being of a predetermined length in general correspondence with a depth of cavity 310.

Ball retaining cap 312 is mounted to the first end of sliding member 280 by a spring 350 (may also be mounted by threads, swaging, adhesive, etc.) and constitutes first end 284 of sliding member assembly 278. Cap 312 is shaped in the form of a cup, and includes an opening 322 extending through the bottom of the cup and having a diameter configured for a slide fit of a portion of stem 320 contiguous to stem second end 318. An inner diameter of cap 312, constituting the inside wall of the cup, is of a diameter slightly greater than is the sum of the diameters of stem narrowing 336 and of two balls 314, allowing clearance for a rolling fit.

In the process of assembling sliding member assembly 278, second end 318 of stem 320 is first passed through opening 322 of cap 312 so that opening 322 is adjacent stem narrowing 336. The second end 318 of stem 320 is inserted into cavity 310 of sliding member 280, the balls 314 are then put into holes 319, the cap 312 is then slid over to encapsulate the balls 314.

Stem 320 is thereby longitudinally movable with respect to sliding member assembly 278, within a predetermined range of movement dependent upon the length of stem narrowing 336 and the diameters of balls 314, an end of stem narrowing 336 bearing upon balls 314 at each end of the range of movement (shown as an ON stop 340 and an OFF stop 338) and thereby defining the dimensional length of the range. As shown in FIG. 4, wherein valve 202 is at rest and is not receiving an ENGAGE signal, a modulating spring 350 (seated upon retaining cap 312 and bearing upon second end 334 of piston 330) is urging piston 330 with stem 320 away from sliding member assembly 278, and OFF stop 338 has engaged balls 314 so that sliding member assembly 278 is retracted along with piston 330; i.e., is rigidly coupled to piston 330 in a retracting direction of motion.

In an alternative embodiment (not shown), a narrowing of a stem extends to a second end of the stem, an opening in a cap is configured for a slide fit with respect to the narrowing, the end of the narrowing is enlarged (e.g., by adding a snap ring or a spring pin, or by forming over, etc.) after being passed through the cap to retain the stem to the cap, the assembly then not including any bearing balls.

Tank return cores 240 are connected by additional cored passages (not shown) within body 208 to drain chamber 122 and housing 120 when desired, and are generally located to bleed off any leakage which may occur past spool lands 288, 292, 268, and a spool 162 of differential lock solenoid valve 152, as well as piston 330.

Referring now to FIG. 5, in conjunction with FIG. 2, a transient condition is shown during which a rising electrical ENGAGE control signal is being received by control signal core valve 260, which is responding by producing a corresponding fluid pressure in control fluid signal core 232 upon first end 332 of piston 330. Piston 330 and stem 320 move to the left against the force, initially, of only preload spring 360, which compresses in correspondence to the control fluid pressure existing upon piston 330. Modulating spring 350 is relatively stiff and does not yet substantially compress, thus causing balls 314 to remain engaged with OFF stop 338 and therefore causing sliding member assembly 278 to remain in a substantially fixed relationship with respect to piston 330 and stem 320.

This quickly increases the amount of open area of lube fluid spool outlet notch 294 which is exposed for flow of lube fluid, and hence the flow rate of lube fluid from lube fluid inlet core 236 to lube fluid outlet core 238 and into housing 120 of clutch 114 (shown in FIG. 2), initiating an accumulation of lube fluid in anticipation of generation of frictional engagement heat. A modulating spool inlet notch 290 will still not have reached main inlet core 230, however, and so no actuating fluid is yet being sent to clutch 114. Modulating spool inlet notch 290 is spaced a predetermined distance farther apart from main inlet core 230 than is lube fluid spool outlet notch 294 from lube fluid outlet core 238, in order to delay application of actuating fluid at pressure to clutch piston 124 and thereby preclude generation of heat before sufficient lube fluid accumulates within clutch housing 120 to remove the heat.

It should be observed that, in order to place a predetermined amount of lube fluid within clutch housing 120 prior to generation of heat of engagement by pressure plates 126 and clutch plates 128, both rate of flow and length of time of flow must be considered. Length of time of flow is selected for an acceptably quick engagement of clutch 114, and is divided into the quantity of lube fluid required to carry off the predetermined heat of engagement in order to pre-determine a time-averaged lube fluid flow rate. Valve 202, and particularly lube fluid spool 292 and associated cores 236 and 238, are adapted to provide this flow rate in response to a particular control signal level and at an anticipated particular fluid pressure drop.

FIG. 6 shows control valve 202 in a condition of modulating flow rate of lube fluid and beginning to modulate pressure of actuating fluid. Sliding member assembly 278 has been forced slightly farther to the left than was seen in FIG. 5, and modulating spool inlet notch 290 has begun to overlap main inlet core 230. Fluid has begun to flow over inlet notch 290 from main inlet core 230 to actuating fluid core 234, albeit at a low pressure and flow rate due to a high pressure drop over the presently small opening of modulating spool inlet notch 290. As electrical control signal strength increases, however, sliding member assembly 278 is shifted farther leftward, the flow area available at modulating spool inlet notch 290 correspondingly increases, and actuating fluid flow rate and pressure thereby increase as well.

As actuating fluid thus begins to flow into actuating fluid core 234, it also flows into and through a passage 296 located and disposed as shown upon and within sliding member 280. The fluid reaches a chamber comprising a portion of cavity 214 located between second end plug 218 and second end 286 of sliding member assembly 278, and exerts a longitudinally disposed force upon sliding member 280. Because of the sliding relationship between sliding member assembly 278 and stem 320, this force is opposed only by a force exerted by modulating spring 350. Longitudinal position of sliding member assembly 278 within cavity 214 thus becomes, in this condition of operation, a function of the spring rate of modulating spring 350, the pressure of the actuating fluid and the axially projected area of second end 286 of sliding member 280, and the longitudinal position of piston 330, which is in turn a function of the spring rate of preload spring 360, control signal pressure within control signal fluid core 232, and the longitudinally projected area of first end 332 of piston 330. By now, pressure plate 126 is bearing upon clutch plate 128 and generating heat while accelerating output shaft 118 to the rotative speed of input shaft 116, and the heat is being dissipated to the increased quantity of lube fluid and carried off by the increased flow rate of lube fluid.

FIG. 7, in conjunction with FIG. 2, shows control valve 202 in a condition of receiving an ENGAGE signal of maximum strength and operating in a saturated steady state. Control fluid valve 260 has opened fully, admitting full regulated main inlet core 230 pressure to control signal core 232 and hence to first end 332 of piston 330. Sliding member assembly 278 has been shifted farther to the left as the force upon first end 332 of piston 330 has increased and caused further compression of preload spring 360, causing modulating spool inlet notch 290 to further overlap main inlet core 230 and allow more actuating fluid at higher pressure to enter actuator fluid core 234 and flow to chamber 122 of clutch 114. Control signal valve 260 is fully open.

The surface area of first end 332 of piston 330 is larger than is the projected surface area of second end 286 of sliding member 280, however, and therefore the force exerted in a leftward direction by piston 330 is proportionally larger than is the force exerted in a rightward direction by sliding member 280. Piston 330 is made even larger in diameter for the force it exerts in this condition of operation to be sufficient to also compress both preload spring 360 and modulating spring 350, thus driving stem 320 leftward so that balls 314 are engaged by ON stop 340 of stem narrowing 336. Stem 320 is now coupled to sliding member assembly 278 through contact of ON stop 340 with balls 314; i.e., rigidly connected in an extending direction. Piston 330 therefore drives sliding member assembly 278 to a left-most position against body second end plug 218.

As long as solenoid 262 receives sufficient ENGAGE signal as shown in FIG. 7, the embodiment of control valve 202 shown in FIGS. 4 through 7 will continue to deliver maximum actuation fluid pressure and maximum lube fluid flow rate.

Figure 8:
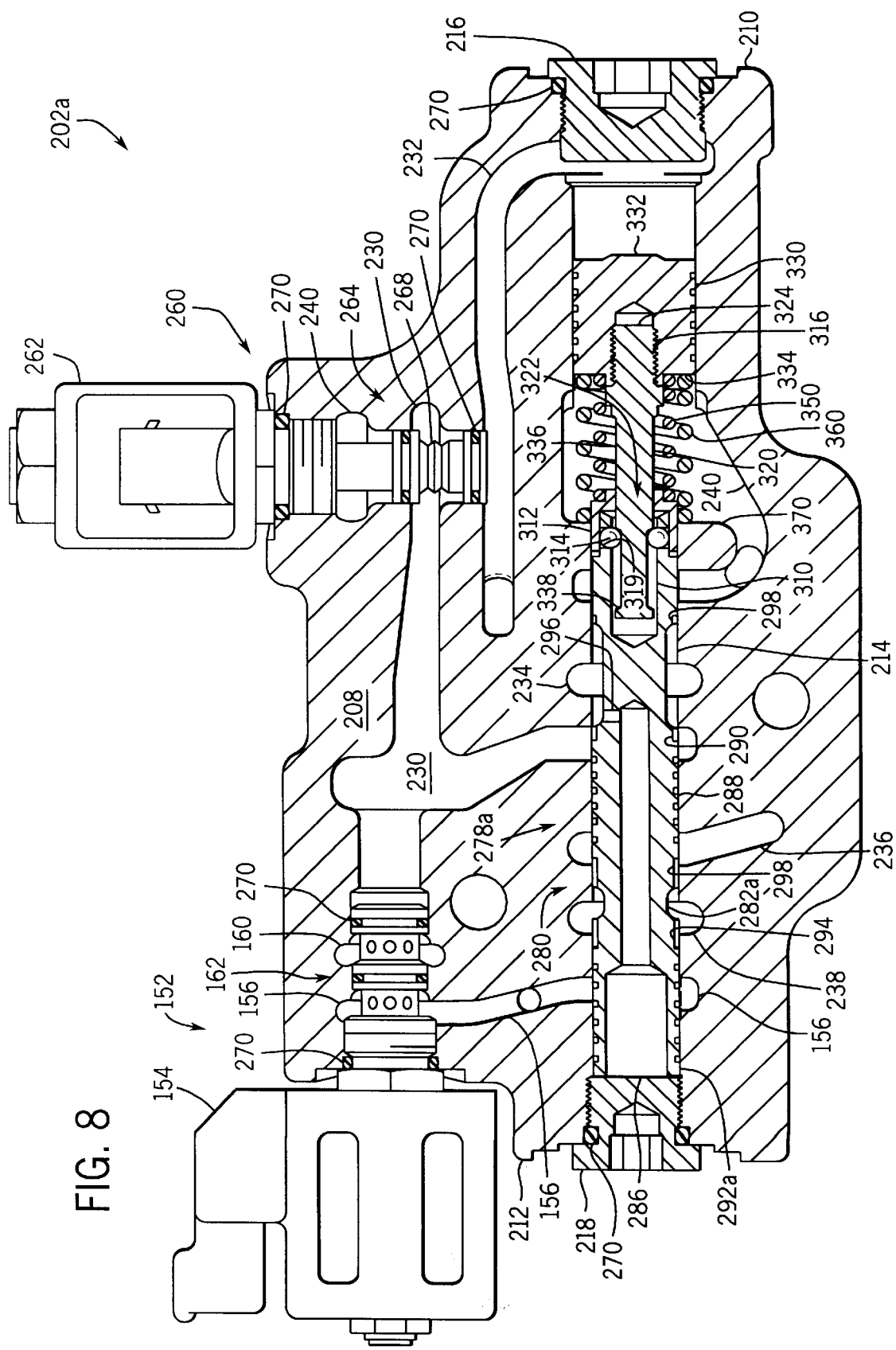
FIG. 8 is a side sectional elevation of an alternative embodiment of a clutch lube fluid flow rate control valve shown in a high-pressure, low-flow rate condition.

FIG. 8 shows an alternative embodiment of a control valve 202(a) for use when less total system lube flow is available. In this embodiment, lube fluid flow rate is reduced when a sliding member assembly 278(a) is shifted to, and maintained in, a fully leftward position in response to a sustained maximum ENGAGE signal. Typically, by the time sliding member assembly 278(a) reaches that position clutch 114 engagement has been substantially completed and significant amounts of frictional heat are no longer being generated, obviating a need for continued high flow rate of lube fluid.

This embodiment includes a shortened lube fluid spool land 292(a) having a shortened spool narrowing 282(a) (i.e., shortened in a comparison of FIG. 8 with FIGS. 4–7). The reduction in length is necessary to prevent lube fluid spool land 292(a) from extending into lube fluid inlet core 236 in the condition of valve 202(a) operation shown. To allow a small maintenance flow of lube fluid while the clutch is operating fully engaged (e.g., to lubricate and cool bearings and seals), a lube fluid spool inlet notch 298 is provided. Operation of lube fluid spool inlet notch 298 is similar to that described above for lube fluid spool outlet notch 294 in conjunction with FIG. 4.

In other alternative embodiments, either of lube fluid spool notches 294 or 298 may be eliminated for use with a clutch on a system which does not need reduced flow of lube fluid.

While the embodiments of the present invention which are illustrated in the Figures and described above are presently preferred, it should be understood that these embodiments are offered only as examples. Several embodiments of the present invention have been disclosed in detail herein, various modifications may be made. For example, the preferred embodiment of the work vehicle 102 describes a vehicle having a frame 104 that supports the engine 108 and wheels 106. Some vehicle structures such as agricultural tractors may not have a frame as a support structures but utilizes the engine block and transmission housing as part of the support structure for the wheels and axles. The work vehicle can also be an articulated vehicle or a tracked vehicle wherein wheels support the tracks. Many variations of construction will be obvious to those of skill in the art, but are nonetheless within the scope and spirit of the present invention. The invention is not intended to be limited to any particular embodiment, but is intended to encompass various modifications and differences of construction that fall within the scope and spirit of the appended claims.

What is claimed is:

1. A work vehicle configured for selectively applying power to a load and comprising:
   a vehicle structure;
   a plurality of ground support devices movably secured to the vehicle structure;
   an engine mounted on the vehicle structure;
   a source of hydraulic fluid at a pressure;
   a clutch for selectively coupling the engine to the load in response to a control signal, the clutch including a clutch actuator configured for engaging the clutch upon receipt of an actuating fluid at at least a first predetermined pressure, the clutch configured to dissipate heat of engagement to a flow of a lube fluid; and
   a clutch control valve including an electrical solenoid located intermediate the fluid source and the clutch and disposed in the path of the actuating fluid and the lube fluid, the control valve configured to:
      control flow of the lube fluid to the clutch to a first predetermined rate while the clutch is not engaged in response to a first electrical signal applied to the electrical solenoid;

control flow of the lube fluid to the clutch to a second predetermined rate at least for a predetermined length of time prior to engagement of the clutch in response to a second electrical signal applied to the electrical solenoid; and control flow of the actuating fluid at a predetermined pressure to the clutch actuator after the flow rate of the lube fluid has been increased.

2. The work vehicle of claim 1, wherein the control valve is further configured to control flow of the lube fluid to a third rate after the clutch has been engaged, which third rate may be equal to the first rate.

3. The work vehicle of claim 1, wherein:
the control valve includes a valve body and a movable member, the movable member at least partially housed within the body and movable with respect to the body; and
the valve is further configured to control flow of both the actuating fluid and the lube fluid by positioning of the movable member within the valve body.

4. The work vehicle of claim 3, wherein the control valve is configured as a spool valve and the movable member is configured as a sliding member for controllably variable sliding within and with respect to the body, the sliding member including:
an actuating fluid spool for engaging at least one actuating fluid port disposed within an actuating fluid cavity of the body; and
a lube fluid spool for engaging at least one lube fluid port disposed within a lube fluid cavity of the valve body, the lube fluid cavity positioned coaxially with the actuating fluid cavity.

5. The work vehicle of claim 4, wherein the sliding member is positioned within the valve body by a spool actuator coupled to the sliding member.

6. A work vehicle configured for selectively applying power to a load and comprising:
a vehicle structure;
a plurality of ground support devices movably secured to the vehicle structure;
an engine mounted on the vehicle structure;
a source of hydraulic fluid at a pressure;
a clutch for selectively coupling the engine to the load in response to a control signal, the clutch including a clutch actuator configured for engaging the clutch upon receipt of an actuating fluid at at least a first predetermined pressure, the clutch configured to dissipate heat of engagement to a flow of a lube fluid; and
a clutch control valve located intermediate the fluid source and the clutch and disposed in the path of the actuating fluid and the lube fluid, the control valve including a valve body and a movable member, the movable member at least partially housed within the body and movable with respect to the body, wherein the control valve is configured to:
control flow of the lube fluid to the clutch to a first predetermined rate while the clutch is not engaged;
control flow of the lube fluid to the clutch to a second predetermined rate at least for a predetermined length of time prior to engagement of the clutch;
control flow of the actuating fluid at a predetermined pressure to the clutch actuator after the flow rate of the lube fluid has been increased;
control flow of the lube fluid to a third rate after the clutch has been engaged, which third rate may be equal to the first rate; and
control flow of both the actuating fluid and the lube fluid by positioning of the movable member within the valve body;
wherein the control valve is configured as a spool valve and the movable member is configured as a sliding member for controllably variable sliding within and with respect to the body, the sliding member including:
an actuating fluid spool for engaging at least one actuating fluid port disposed within an actuating fluid cavity of the body; and
a lube fluid spool for engaging at least one lube fluid port disposed within a lube fluid cavity of the valve body, the lube fluid cavity positioned coaxially with the actuating fluid cavity, and wherein the sliding member is positioned within the valve body by a spool actuator coupled to the sliding member and wherein the spool actuator is a proportional solenoid.

7. A work vehicle configured for selectively applying power to a load and comprising:
a vehicle structure;
a plurality of ground support devices movably secured to the vehicle structure;
an engine mounted on the vehicle structure;
a source of hydraulic fluid at a pressure;
a clutch for selectively coupling the engine to the load in response to a control signal, the clutch including a clutch actuator configured for engaging the clutch upon receipt of an actuating fluid at at least a first predetermined pressure, the clutch configured to dissipate heat of engagement to a flow of a lube fluid; and
a clutch control valve located intermediate the fluid source and the clutch and disposed in the path of the actuating fluid and the lube fluid, the control valve including a valve body and a movable member, the movable member at least partially housed within the body and movable with respect to the body, wherein the control valve is configured to:
control flow of the lube fluid to the clutch to a first predetermined rate while the clutch is not engaged;
control flow of the lube fluid to the clutch to a second predetermined rate at least for a predetermined length of time prior to engagement of the clutch;
control flow of the actuating fluid at a predetermined pressure to the clutch actuator after the flow rate of the lube fluid has been increased;
control flow of the lube fluid to a third rate after the clutch has been engaged, which third rate may be equal to the first rate; and
control flow of both the actuating fluid and the lube fluid by positioning of the movable member within the valve body;
wherein the control valve is configured as a spool valve and the movable member is configured as a sliding member for controllably variable sliding within and with respect to the body, the sliding member including:
an actuating fluid spool for engaging at least one actuating fluid port disposed within an actuating fluid cavity of the body; and
a lube fluid spool for engaging at least one lube fluid port disposed within a lube fluid cavity of the valve body, the lube fluid cavity positioned coaxially with the actuating fluid cavity, and wherein the sliding member is positioned within the valve body by a spool actuator coupled to the sliding member and wherein the spool actuator is a hydraulic piston disposed within a piston cavity of the valve body.

8. The work vehicle of claim 7, wherein the piston is pressurized by control fluid controlled by a proportional solenoid in response to the control signal, and the spools are configured to effect the first lube fluid flow rate and substantially no actuating fluid pressure when the control fluid is at a first pressure and to effect the second lube fluid flow rate and full actuating fluid pressure when the control fluid is at a second pressure.

9. The work vehicle of claim 8, wherein the proportional solenoid is affixed to the valve body and the actuating fluid, lube fluid, and control fluid are all obtained from one common fluid inlet chamber of the valve body.

10. The work vehicle of claim 9, wherein the control valve includes a second solenoid valve in fluid communication with the common fluid inlet chamber for control of at least one of fluid flow rate and pressure to another operational device of the work vehicle.

11. The work vehicle of claim 10, wherein the other operational device is a differential gear unit lockup clutch.

12. The work vehicle of claim 7, wherein:
the piston is coaxial with the sliding member;
the piston and the sliding member comprise a sliding assembly having a first piston end and a second sliding member end;
the face area of the piston end is larger than the face area of the sliding member end;
the piston end is in fluid communication with the control fluid and the sliding member is in fluid communication with the actuating fluid;
a modulating spring having a spring rate of force versus distance of deflection is configured and disposed to urge the sliding assembly away from the piston end; and
the position of the sliding member within and with respect to the valve body is controlled by the combined force of the modulating spring and actuating fluid pressure upon the sliding member end opposing the force of control fluid pressure upon the piston end;
lube fluid flow rate and actuating fluid pressure being thereby in correspondence with control fluid pressure.

13. The work vehicle of claim 12, wherein the control valve further comprises a preload spring disposed in parallel with the modulating spring for modifying the valve characteristic curve of lube fluid flow rate and actuating fluid pressure versus control fluid pressure.

14. A power transmission system for selectively transmitting power to a load and comprising:
a power source;
a source of hydraulic fluid at a pressure;
a clutch for selectively coupling the power source to the load in response to a control signal, the clutch including a clutch actuator configured for engaging the clutch upon receipt of an actuating fluid at at least a first predetermined pressure, the clutch configured to dissipate heat of engagement to a flow of a lube fluid; and
a clutch control valve including an electrical actuator located intermediate the fluid source and the clutch and disposed in the path of the actuating fluid and the lube fluid, the control valve configured to:
control flow of the lube fluid to the clutch to a first predetermined rate while the clutch is not engaged in response to a first electrical signal applied to the electrical actuator;
control flow of the lube fluid to the clutch to a second predetermined rate at least for a predetermined length of time prior to engagement of the clutch in response to a second electrical signal applied to the electrical actuator; and
control flow of the actuating fluid at a predetermined pressure to the clutch actuator after the flow rate of the lube fluid has been increased.

15. The power transmission system of claim 14, wherein the control valve is further configured to control flow of the lube fluid to a third rate after the clutch has been engaged, which third rate may be equal to the first rate.

16. The power transmission system of claim 14, wherein:
the control valve includes a valve body and a movable member, the movable member at least partially housed within the body and movable with respect to the body; and
the valve is further configured to control flow of both the actuating fluid and the lube fluid by positioning of the movable member within the valve body.

17. The power transmission system of claim 16, wherein the control valve is configured as a spool valve and the movable member is configured as a sliding member for controllably variable sliding within and with respect to the body, the sliding member including:
an actuating fluid spool for engaging at least one actuating fluid port disposed within an actuating fluid cavity of the body; and
a lube fluid spool for engaging at least one lube fluid port disposed within a lube fluid cavity of the valve body, the lube fluid cavity positioned coaxially with the actuating fluid cavity.

18. The power transmission system of claim 17, wherein the sliding member is positioned within the valve body by the electrical actuator coupled to the sliding member.

19. A power transmission system for selectively transmitting power to a load and comprising:
a power source;
a source of hydraulic fluid at a pressure;
a clutch for selectively coupling the power source to the load in response to a control signal, the clutch including a clutch actuator configured for engaging the clutch upon receipt of an actuating fluid at at least a first predetermined pressure, the clutch configured to dissipate heat of engagement to a flow of a lube fluid; and
a clutch control valve located intermediate the fluid source and the clutch and disposed in the path of the actuating fluid and the lube fluid and including a valve body and a movable member, the movable member at least partially housed within the body and movable with respect to the body, wherein the control valve is configured to:
control flow of the lube fluid to the clutch to a first predetermined rate while the clutch is not engaged;
control flow of the lube fluid to the clutch to a second predetermined rate at least for a predetermined length of time prior to engagement of the clutch;
control flow of the actuating fluid at a predetermined pressure to the clutch actuator after the flow rate of the lube fluid has been increased;
control flow of the lube fluid to a third rate after the clutch has been engaged, which third rate may be equal to the first rate; and
control flow of both the actuating fluid and the lube fluid by positioning of the movable member within the valve body,
wherein the control valve is further configured as a spool valve and the movable member is configured as a sliding member for controllably variable sliding within and with respect to the body, the sliding member including an actuating fluid spool for engaging at least one actuating fluid port disposed within an actuating fluid cavity of the body, and a lube fluid spool for engaging at least one lube fluid port disposed within a lube fluid cavity of the valve body, the lube fluid cavity positioned coaxially with the actuating fluid cavity, wherein the sliding member is positioned within the valve body by a spool actuator coupled to the sliding member and wherein the spool actuator is a proportional solenoid.

20. A power transmission system for selectively transmitting power to a load and comprising:

a power source;

a source of hydraulic fluid at a pressure;

a clutch for selectively coupling the power source to the load in response to a control signal, the clutch including a clutch actuator configured for engaging the clutch upon receipt of an actuating fluid at at least a first predetermined pressure, the clutch configured to dissipate heat of engagement to a flow of a lube fluid; and a clutch control valve located intermediate the fluid source and the clutch and disposed in the path of the actuating fluid and the lube fluid and including a valve body and a movable member, the movable member at least partially housed within the body and movable with respect to the body, wherein the control valve is configured to:

control flow of the lube fluid to the clutch to a first predetermined rate while the clutch is not engaged;

control flow of the lube fluid to the clutch to a second predetermined rate at least for a predetermined length of time prior to engagement of the clutch;

control flow of the actuating fluid at a predetermined pressure to the clutch actuator after the flow rate of the lube fluid has been increased;

control flow of the lube fluid to a third rate after the clutch has been engaged, which third rate may be equal to the first rate; and controll flow of both the actuating fluid and the lube fluid by positioning of the movable member within the valve body, wherein the control valve is further configured as a spool valve and the movable member is configured as a sliding member for controllably variable sliding within and with respect to the body, the sliding member including an actuating fluid spool for engaging at least one actuating fluid port disposed within an actuating fluid cavity of the body, and a lube fluid spool for engaging at least one lube fluid port disposed within a lube fluid cavity of the valve body, the lube fluid cavity positioned coaxially with the actuating fluid cavity, wherein the sliding member is positioned within the valve body by a spool actuator coupled lo the sliding member and wherein the spool actuator is a hydraulic piston disposed within a piston cavity of the valve body.

21. The power transmission system of claim 20, wherein the piston is pressurized by control fluid controlled by a proportional solenoid in response to the control signal, and the spools are configured to effect the first lube fluid flow rate and substantially no actuating fluid pressure when the control fluid is at a first pressure and to effect the second lube fluid flow rate and full actuating fluid pressure when the control fluid is at a second pressure.

22. The power transmission system of claim 21, wherein the proportional solenoid is affixed to the valve body and the actuating fluid, lube fluid, and control fluid are all obtained from one common fluid inlet chamber of the valve body.

23. The power transmission system of claim 22, wherein the control valve includes a second solenoid valve in fluid communication with the common fluid inlet chamber for control of at least one of fluid flow rate and pressure to another operational device associated with the power transmission system.

24. The power transmission system of claim 20, wherein:

the piston is coaxial with the sliding member;

the piston and the sliding member comprise a sliding assembly having a first piston end and a second sliding member end;

the face area of the piston end is larger than is that of the sliding member end;

the piston end is in fluid communication with the control fluid and the sliding member is in fluid communication with the actuating fluid;

a modulating spring having a spring rate of force versus distance of deflection is configured and disposed to urge the sliding assembly away from the piston end; and the position of the sliding member within and with respect to the valve body is controlled by the combined force of the modulating spring and actuating fluid pressure upon the sliding member end opposing the force of control fluid pressure upon the piston end;

lube fluid flow rate and actuating fluid pressure being thereby in correspondence with control fluid pressure.

25. The power transmission system of claim 24, wherein the control valve further comprises a preload spring disposed in parallel with the modulating spring for modifying the valve characteristic curve of lube fluid flow rate and actuating fluid pressure versus control fluid pressure.

26. A control apparatus for a hydraulically operated wet disk clutch, the clutch including a piston actuated by actuating fluid at a predetermined actuating fluid pressure and coupled to at least one clutch disk, a chamber surrounding the at least one clutch disk and at least one pressure disk and containing a controllably variable amount of lube fluid for lubrication of the clutch and for removal of heat generated by friction during engagement of the clutch disks, the control apparatus comprising:

a means for controlling flow of the lube fluid to the clutch to a first predetermined rate while the clutch is not engaged in response to a first electrical valve command;

a means for controlling flow of the lube fluid to the clutch to a second predetermined rate at least for a predetermined length of time prior to engagement of the clutch in response to a second electrical valve command; and a means for controlling flow of the actuating fluid at a predetermined pressure to the clutch actuator after the flow rate of the lube fluid has been increased.

27. The control apparatus of claim 26, including a means for controlling flow of the lube fluid to a third rate after the clutch has been engaged, which third rate may be equal to the first rate.

28. The control apparatus of claim 26, wherein the means for controlling flow is a control valve having a valve body and a movable member, and wherein:

the movable member is at least partially housed within the body and movable with respect to the body; and the control valve is further configured to control flow of both the actuating fluid and the lube fluid by positioning of the movable member within the valve body.

29. The control apparatus of claim 28, wherein the control valve is configured as a spool valve and wherein the movable member is configured as a sliding, member for controllably variable sliding within and with respect to the body, the sliding member comprising:

an actuating fluid spool for engaging at least one actuating fluid port disposed within an actuating fluid cavity of the body; and a lube fluid spool for engaging at least one lube fluid port disposed within a lube fluid cavity of the valve body, the lube fluid cavity positioned coaxially with the actuating fluid cavity.

30. The control apparatus of claim 29, wherein the sliding member is positioned within the valve body by a spool actuator coupled to the sliding member.

31. A control apparatus for a hydraulically operated wet disk clutch, the clutch including a piston actuated by actuating fluid at a predetermined actuating fluid pressure and coupled to at least one clutch disk, a chamber surrounding the at least one clutch disk and at least one pressure disk, and containing a controllably variable amount of lube fluid for lubrication of the clutch and for removal of heat generated by friction during engagement of the clutch disks, the control apparatus comprising:

a means for controlling flow of the lube fluid to the clutch to a first predetermined rate while the clutch is not engaged;

a means for controlling flow of the lube fluid to the clutch to a second predetermined rate at least for a predetermined length of time prior to engagement of the clutch; and a means for controlling flow of the actuating fluid at a predetermined pressure to the clutch actuator after the flow rate of the lube fluid has been increased, wherein the means for controlling flow is a control valve having a valve body and a movable member, and wherein the movable member is at least partially housed within the body and movable with respect to the body, and wherein the control valve is further configured to control flow of both the actuating fluid and the lube fluid by positioning of the movable member within the valve body and further wherein the control valve is configured as a spool valve and wherein the movable member is configured as a sliding member for controllably variable sliding within and with respect to the body, the sliding member comprising an actuating fluid spool for engaging at least one actuating fluid port disposed within an actuating fluid cavity of the body and a lube fluid spool for engaging at least one lube fluid port disposed within a lube fluid cavity of the valve body, the lube fluid cavity positioned coaxially with the actuating fluid cavity, wherein the spool actuator is a proportional solenoid.

32. A control apparatus for a hydraulically operated wet disk clutch, the clutch including a piston actuated by actuating fluid at a predetermined actuating fluid pressure and coupled to at least one clutch disk, a chamber surrounding the at least one clutch disk and at least one pressure disk, and containing a controllably variable amount of lube fluid for lubrication of the clutch and for removal of heat generated by friction during engagement of the clutch disks, the control apparatus comprising:

a means for controlling flow of the lube fluid to the clutch to a first predetermined rate while the clutch is not engaged;

a means for controlling flow of the lube fluid to the clutch to a second predetermined rate at least for a predetermined length of time prior to engagement of the clutch; and a means for controlling flow of the actuating fluid at a predetermined pressure to the clutch actuator after the flow rate of the lube fluid has been increased, wherein the means for controlling flow is a control valve having a valve body and a movable member, and wherein the movable member is at least partially housed within the body and movable with respect to the body, and wherein the control valve is further configured to control flow of both the actuating fluid and the lube fluid by positioning of the movable member within the valve body and further wherein the control valve is configured as a spool valve and wherein the movable member is configured as a sliding member for controllably variable sliding within and with respect to the body, the sliding member comprising an actuating fluid spool for engaging at least one actuating fluid port disposed within an actuating fluid cavity of the body and a lube fluid spool for engaging at least one lube fluid port disposed within a lube fluid cavity of the valve body, the lube fluid cavity positioned coaxially with the actuating fluid cavity, wherein the spool actuator is a hydraulic piston disposed within a piston cavity of the valve body.

33. The control apparatus of claim 32, wherein the piston is pressurized by control fluid controlled by a proportional solenoid in response to the control signal, and the spools are configured to effect the first lube fluid flow rate and substantially no actuating fluid pressure when the control fluid is at a first pressure and to effect the second lube fluid rate and full actuating fluid pressure when the control fluid is at a second pressure.

34. The control apparatus of claim 33, wherein the proportional solenoid is affixed to the valve body and the actuating fluid, lube fluid, and control fluid are all obtained from one common fluid inlet chamber of the valve body.

35. The control apparatus of claim 34, further including a second solenoid valve in communication with the common fluid inlet chamber for control of at least one of fluid flow rate and pressure to another operational device associated with the control valve.

36. The control apparatus of claim 32, wherein:

the piston is coaxial with the sliding member;

the piston and the sliding member comprise a sliding assembly having a piston end and a sliding member end;

the face area of the piston end is larger than the face area of the sliding member end;

the piston end is in fluid communication with the control fluid and the sliding member end is in fluid communication with the actuating fluid;

a modulating spring having a spring rate of force versus distance of deflection is configured and disposed to urge the sliding assembly away from the piston end; and the position of the sliding member within and with respect to the valve body is controlled by the combined force of the modulating spring and actuating fluid pressure upon the sliding member end opposing the force of control fluid pressure upon the piston end;

lube fluid flow rate and actuating fluid pressure being thereby in correspondence with control fluid pressure.

37. The control apparatus of claim 36, wherein the control valve includes a means for modifying the valve characteristic curve of lube fluid flow rate and actuating fluid pressure versus control fluid pressure.

38. The control apparatus of claim 37 wherein the means for modifying is a preload spring disposed in parallel with the modulating spring.

39. A method of removing heat of frictional engagement from a wet disk clutch, the method comprising the steps of:

a. energizing at least one electrical solenoid with a first electrical signal to shift a sliding member of a control valve a first distance to open a port of a lube fluid spool of the sliding member and thereby increase a flow of a cooling lube fluid to a first rate; and b. energizing the at least one electrical solenoid with a second electrical signal to shift the sliding member an additional second distance to open a port of an actuating fluid spool of the sliding member and thereby transmit an actuating fluid at an actuation fluid pressure to an actuator of the clutch.

40. The method of claim 39, further comprising the step of:

c. shifting the sliding member an additional third distance to at least partially close the port of the lube fluid spool and thereby reduce the flow of lube fluid to a second rate, the second rate of flow smaller than the first rate of flow.

* * * * *